(12) United States Patent
Post et al.

(10) Patent No.: US 9,063,886 B2
(45) Date of Patent: Jun. 23, 2015

(54) METADATA REDUNDANCY SCHEMES FOR NON-VOLATILE MEMORIES

(75) Inventors: Daniel J. Post, Campbell, CA (US); Vadim Khmelnitsky, Foster City, CA (US); Nir J. Wakrat, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 748 days.

(21) Appl. No.: 12/562,860

(22) Filed: Sep. 18, 2009

(65) Prior Publication Data

US 2011/0072189 A1 Mar. 24, 2011

(51) Int. Cl.
*G06F 12/00* (2006.01)
*G06F 11/14* (2006.01)
*G06F 11/16* (2006.01)
*G06F 12/02* (2006.01)

(52) U.S. Cl.
CPC ........ *G06F 11/1402* (2013.01); *G06F 11/1666* (2013.01); *G06F 12/0246* (2013.01); *G06F 2212/7201* (2013.01); *G06F 2212/7207* (2013.01)

(58) Field of Classification Search
CPC ... G06F 12/0246; G06F 3/0679; G06F 3/065; G06F 2212/222; G06F 12/0238; G06F 12/10; G06F 12/00; G06F 12/02; G06F 11/1402; G06F 11/1666; G06F 2212/7207; G06F 2212/7201
USPC ........... 711/103, 162, 202, E12.001, E12.008
See application file for complete search history.

(56) References Cited

U.S. PATENT DOCUMENTS

| | | | |
|---|---|---|---|
| 6,529,997 B1 | 3/2003 | Debiez et al. | |
| 7,139,863 B1 | 11/2006 | Defouw et al. | |
| 7,366,825 B2 | 4/2008 | Williams et al. | |
| 7,389,397 B2 | 6/2008 | Paley et al. | |
| 7,676,482 B2 | 3/2010 | Sprague et al. | |
| 8,028,123 B2* | 9/2011 | Kilzer et al. | 711/103 |
| 8,151,060 B2* | 4/2012 | Mizushima | 711/141 |
| 8,171,205 B2 | 5/2012 | Royer et al. | |
| 8,341,375 B2* | 12/2012 | So et al. | 711/170 |
| 2006/0039196 A1 | 2/2006 | Gorobets et al. | |
| 2006/0064539 A1 | 3/2006 | Mukaida et al. | |
| 2007/0022241 A1 | 1/2007 | Sinclair | |
| 2007/0083697 A1 | 4/2007 | Birrell et al. | |
| 2007/0136501 A1 | 6/2007 | Chang et al. | |
| 2007/0268905 A1 | 11/2007 | Baker et al. | |
| 2008/0010580 A1 | 1/2008 | Anderson et al. | |
| 2008/0098157 A1 | 4/2008 | Andrewartha et al. | |
| 2008/0126848 A1 | 5/2008 | Yoshida | |

(Continued)

*Primary Examiner* — Jasmine Song
(74) *Attorney, Agent, or Firm* — Van Court & Aldridge LLP (57) ABSTRACT

Systems and methods are provided for storing data to or reading data from a non-volatile memory ("NVM"), such as flash memory, using a metadata redundancy scheme. In some embodiments, an electronic device, which includes an NVM, may also include a memory interface for controlling access to the NVM. The memory interface may receive requests to write user data to the NVM. The user data from each request may be associated with metadata, such as a logical address, flags, or other data. In response to a write request, the NVM interface may store the user data and its associated metadata in a first memory location (e.g., page), and may store a redundant copy of the metadata in a second memory location. This way, even if the first memory location becomes inaccessible, the memory interface can still recover the metadata from the backup copy stored in the second memory location.

25 Claims, 7 Drawing Sheets

(56) References Cited

U.S. PATENT DOCUMENTS

| | | |
|---|---|---|
| 2008/0270730 A1 | 10/2008 | Lasser et al. |
| 2008/0288712 A1 | 11/2008 | Cornwell et al. |
| 2008/0313416 A1 | 12/2008 | Frondozo et al. |
| 2009/0100115 A1 | 4/2009 | Park et al. |
| 2009/0109786 A1 | 4/2009 | Ye et al. |
| 2009/0157950 A1 | 6/2009 | Selinger |
| 2009/0157989 A1 * | 6/2009 | Karamcheti et al. ......... 711/156 |
| 2009/0158085 A1 | 6/2009 | Kern et al. |
| 2009/0172262 A1 | 7/2009 | Olbrich et al. |
| 2009/0172335 A1 | 7/2009 | Kulkarni et al. |
| 2010/0217921 A1 | 8/2010 | Mun |
| 2011/0072189 A1 | 3/2011 | Post et al. |

* cited by examiner

METADATA REDUNDANCY SCHEMES FOR NON-VOLATILE MEMORIES

FIELD OF THE INVENTION

This can relate to systems and methods for storing metadata in memory locations of a non-volatile memory.

BACKGROUND OF THE DISCLOSURE

NAND flash memory, as well as other types of non-volatile memories ("NVMs"), are commonly used in electronic devices for mass storage. For example, consumer electronics such as portable media players often include flash memory to store music, videos, and other media.

Non-volatile memories, however, may develop defective memory cells through everyday use, and operational memory cells may suffer from program/erase/read disturb due to voltages applied to neighboring cells. When a memory location, such as a page, of a NVM contains too many defective cells or otherwise becomes unusable from excessive errors, the information contained within that memory location may be lost. When this occurs, the electronic device using the NVM might lose user data (e.g., data stored by an application). In addition, the electronic device might lose metadata that the electronic device uses to manage the NVM. This can affect the performance of the non-volatile memory.

SUMMARY OF THE DISCLOSURE

Accordingly, systems and methods are disclosed for providing metadata redundancy in a non-volatile memory ("NVM"). The redundant metadata may include a logical address, for example, and may be used to enable recovery of the metadata when one or more memory locations of the NVM becomes defective or suffers from other error-causing phenomena.

In some embodiments, an electronic device is provided that may include a system-on-a-chip and a NVM. The NVM may include flash memory, such as NAND flash memory, or any other suitable type of non-volatile memory.

The system-on-a-chip can include a NVM interface, sometimes referred to herein as a "memory interface," for accessing the NVM. In some embodiments, the memory interface may receive write requests from a file system to store user data at a logical address. The memory interface may map the logical address to a physical address and may store the user data at the physical address of the NVM.

The memory interface may store metadata associated with the user data at the physical address in which the user data is stored. The metadata may include the logical address or any other information generated by the memory interface for use in managing the NVM. The memory interface may additionally store redundant copies of the metadata at one or more other physical addresses. For example, the memory interface may save the metadata in a buffer, and may program the metadata to another physical address in response to a second, subsequent write request from the file system.

Using this approach, the metadata for the user data can be stored at multiple locations in the NVM, and the memory interface can recover the metadata from another location if the physical address at which the user data is stored becomes inaccessible (e.g., due to read/program/erase disturb, defects, or other error-causing phenomena). For example, in response to determining that data read from a first page is not usable, the NVM interface may read a second page that also contains the metadata for the user data stored at the first page, and may extract the metadata from the second page.

To ensure that the same piece of metadata can be read from multiple locations, at least some of the memory locations of a NVM may each be used to store multiple copies of metadata. The different copies of metadata stored at a particular memory location may be associated with different user data stored at different memory locations of the NVM. For example, one piece of metadata in a current memory location may be associated with user data that is also stored at the current memory location. Another piece of metadata in the current memory location, sometimes referred to as the "redundant metadata," may be associated with user data stored at another memory location (e.g., from a previous write request).

In some embodiments, the other memory location (e.g., from the previous write request) may have a particular geometric relationship or mapping with respect to the current memory location. For example, the redundant metadata stored at a current page may be associated with user data stored in a previous page in the same block (i.e., "above-me" redundancy). As another example, the redundant metadata may be associated with user data stored in a corresponding page of a previous block of the same super block (i.e., "left-of-me" redundancy). As still another example, the redundant metadata may be associated with user data stored in a previous page of a previous block (i.e., "diagonal-to-me" redundancy).

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
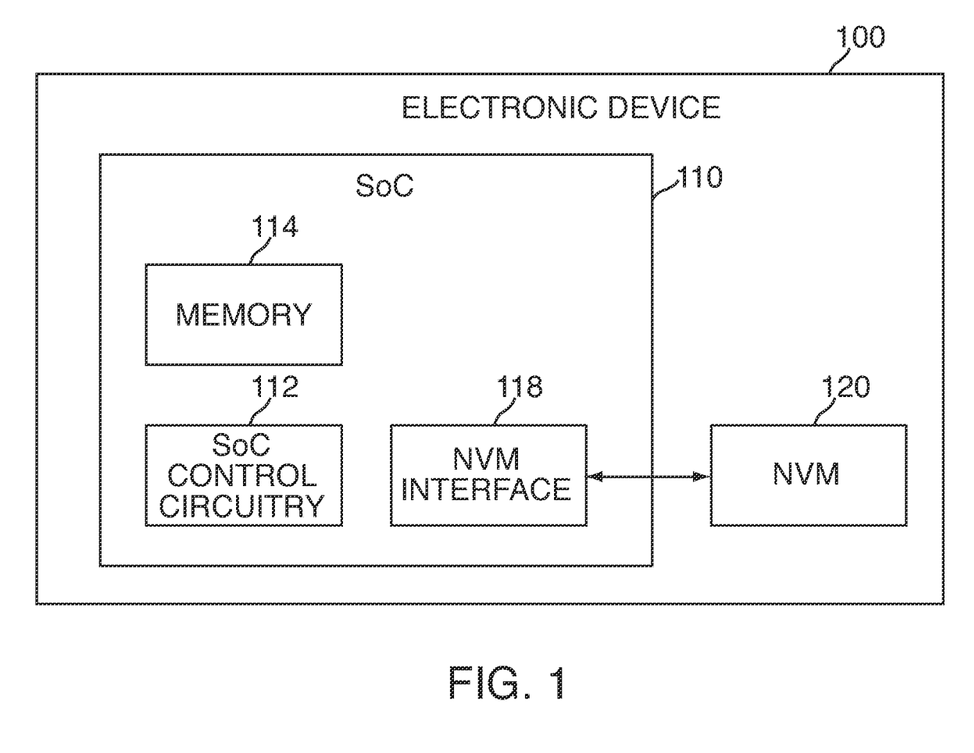
FIGS. 1 and 2 are schematic views of electronic devices configured in accordance with various embodiments of the invention.

FIG. 1 is a schematic view of electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), any other known or future types of non-volatile memory technology, or any combination thereof. NVM 120 can be organized into "blocks" that may each be erasable at once, and further organized into "pages" that may each be programmable and readable at once. In some embodiments, NVM 120 can include multiple integrated circuits, where each integrated circuit may have multiple blocks. The blocks from corresponding integrated circuits (e.g., blocks having the same position or block number) may form "super blocks." Each memory location (e.g., page or block) of NVM 120 can be addressed using a physical address (e.g., a physical page address or physical block address).

FIG. 1, as well as later figures and various disclosed embodiments, may sometimes be described in terms of using flash technology. However, this is not intended to be limiting, and any other type of non-volatile memory can be implemented instead. Electronic device 100 can include other components, such as a power supply or any user input or output components, which are not depicted in FIG. 1 to prevent overcomplicating the figure.

System-on-a-chip 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write commands to NVM interface 118 to obtain data from or store data in NVM 120. For clarity, data that SoC control circuitry 112 may request for storage or retrieval may be referred to as "user data," even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile or non-volatile memory, such as dynamic random access memory ("DRAM"), synchronous dynamic random access memory ("SDRAM"), double-data-rate ("DDR") RAM, cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write commands from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, a processor implemented as part of SoC control circuitry 112 may execute a software-based memory driver for NVM interface 118. Accordingly, portions of SoC control circuitry 112 and NVM interface 118 may sometimes be referred to collectively as "control circuitry."

FIG. 1 illustrates an electronic device where NVM 120 may not have its own controller. In other embodiments, electronic device 100 can include a target device, such as a flash or SD card, that includes NVM 120 and some or all portions of NVM interface 118 (e.g., a translation layer, discussed below). In these embodiments, SoC 110 or SoC control circuitry 112 may act as the host controller for the target device. For example, as the host controller, SoC 110 can issue read and write requests to the target device.

Figure 2:
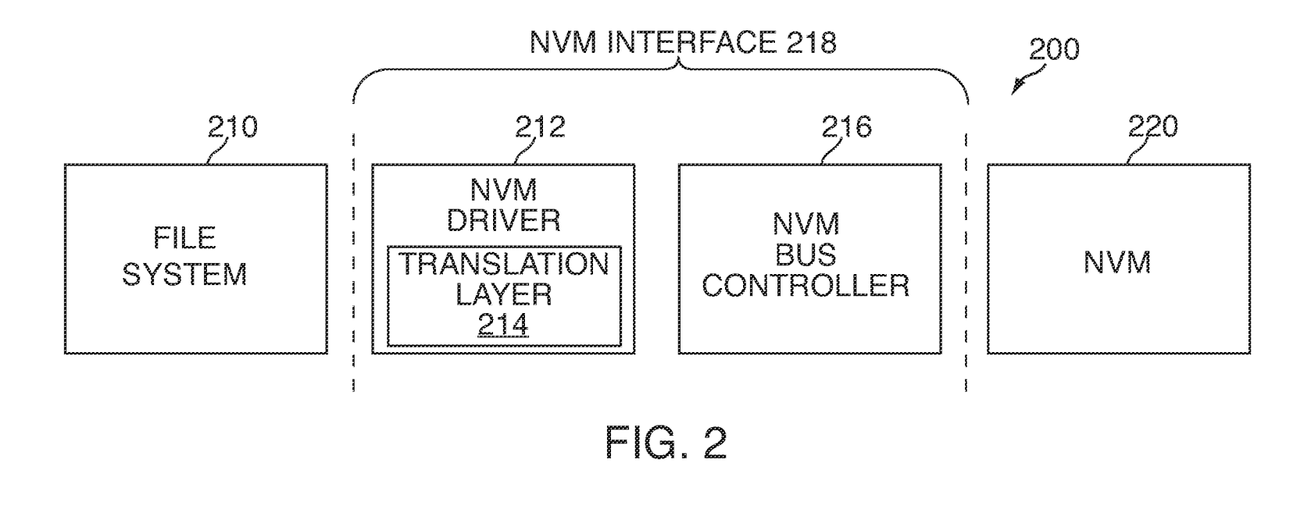

FIG. 2 is a schematic view of electronic device 200, which may illustrate in greater detail some of the firmware, software and/or hardware components of electronic device 100 (FIG. 1) in accordance with various embodiments. Electronic device 200 may have any of the features and functionalities described above in connection with FIG. 1, and vice versa. Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system, such as a File Allocation Table ("FAT") file system, and may be part of the operating system of electronic device 200 (e.g., part of SoC control circuitry 112 of FIG. 1). In some embodiments, file system 210 may include a flash file system, such as Yet Another Flash File System ("YAFFS"). In these embodiments, file system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read commands to NVM driver 212 when the application or operating system requests that information be read from or stored in NVM 220. Along with each read or write command, file system 210 can provide a logical address to indicate where the user data should be read from or written to, such as a logical page address or a logical block address with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write operation, translation layer 214 can map the provided logical address to a free, erased physical location on NVM 220. On a read operation, translation layer 214 can use the provided logical address to determine the physical address at which the requested data is stored. Because each NVM may have a different layout depending on the size or vendor of the NVM, this mapping operation may be memory and/or vendor specific. Translation layer 214 can perform any other suitable functions in addition to logical-to-physical address mapping. For example, translation layer 214 can perform any of the other functions that may be typical of flash translation layers, such as garbage collection and wear leveling.

NVM driver 212 may interface with NVM bus controller 216 to complete NVM access requests (e.g., program, read, and erase requests). Bus controller 216 may act as the hardware interface to NVM 220, and can communicate with NVM 220 using the bus protocol, data rate, and other specifications of NVM 220.

NVM interface 218 may manage NVM 220 based on memory management data, sometimes referred to herein as "metadata." The metadata may be generated by NVM driver 212 or may be generated by a module operating under the control of NVM driver 212. For example, metadata can include any information used for managing the mapping between logical and physical addresses, bad block management, wear leveling, error correcting code ("ECC") data, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one memory location of NVM 220. NVM interface 218 may also store other types of metadata about the user data in the same memory location.

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association. This way, even if a separate table maintaining the physical-to-logical mapping in NVM 220 becomes outdated, NVM interface 218 may still determine the proper mapping at power-up or reboot of electronic device 200, for example.

However, a memory location of NVM 220 may become unreadable due to disturb effects from neighboring locations, defects, failed read operations, or due to some other error-causing phenomena. When this occurs, NVM interface 218 may not only lose the actual user data at that memory location, but NVM interface 218 may no longer be able to determine what kind of information was supposed to be stored at that memory location (e.g., may no longer be able to determine the logical address associated with the user data). In other words, NVM interface 218 may lose any information about the user data or any information that NVM interface 218 needs to manage the user data stored at that memory location. This can occur especially during power-up of electronic device 200 when NVM interface 118 may attempt to determine the logical-to-physical address mapping of NVM 220.

In order to alleviate the consequences of losing data stored at a current memory location, NVM interface 218 may store the current location's metadata in a number of other memory locations, sometimes referred to as "backup" memory locations. In particular, the backup memory locations may not be completely filled with user data and metadata from another write request. Therefore, at least some of the remaining space in the backup memory locations may be used to store the current memory location's metadata. As discussed above, this metadata may be referred to as "redundant metadata." Even though NVM interface 218 may not be able to retrieve the user data when the current memory location becomes inaccessible, NVM interface 218 may still be able to recover the metadata for that user data. Using the redundant metadata, NVM interface 218 may be more capable of handling the loss of user data at the current memory location.

In some embodiments, NVM interface 218 may use the redundant metadata to recover an older copy of the lost user data. For example, the redundant metadata may include a logical address for the lost user data, and NVM interface 218 may search through various memory locations of NVM 220 to find another memory location, which may be marked with an older age or previous generation, that stores the same logical address. This way, even though NVM interface 218 may not be able to recover current user data when a memory location becomes inaccessible, NVM interface 218 may still be able to recover an older version of the user data.

In some embodiments, NVM interface 218 may look up redundant metadata from a backup memory location even if this metadata is available from a lookup table of physical-to-logical address maps. At runtime, if NVM interface 218 cannot recover the data stored in a current memory location (e.g., due to disturb effects), NVM interface 218 may obtain the metadata from a backup memory location, thereby avoiding the need to perform a resource-intensive, exhaustive search on a separate table. Also, by storing redundant metadata at backup memory locations containing other user data, a second set of tables for the address map may not be needed.

NVM interface 218 may choose any suitable memory location to store redundant copies of the metadata. The memory locations may be chosen such that there is a one-to-one mapping between the location with the redundant copy and the location with the original metadata and its associated user data. In other words, NVM interface 218 may use any suitable scheme to select a backup memory location as long as there is no ambiguity as to which memory location the backup memory location is backing up.

In some embodiments, the memory locations chosen as backup memory locations may have a particular position in NVM 220 relative to the memory location with the user data. For example, the backup memory location may be the next page of NVM 220 in a sequence of pages in a block, a corresponding page in the next block of a super block (e.g., a page with the same position or page number in its respective block), or a corresponding page in the next block of the same integrated circuit. For simplicity, the blocks and pages of NVM 220 may be represented graphically in two-dimensional or three-dimensional space so that the relationship between two memory locations can be viewed as having a particular geometric relationship with one another. In other words, as illustrated in FIGS. 3-5, using the graphical representation, terms such as "left," "right," "above," "below," and "diagonal" may be used.

Figure 3:
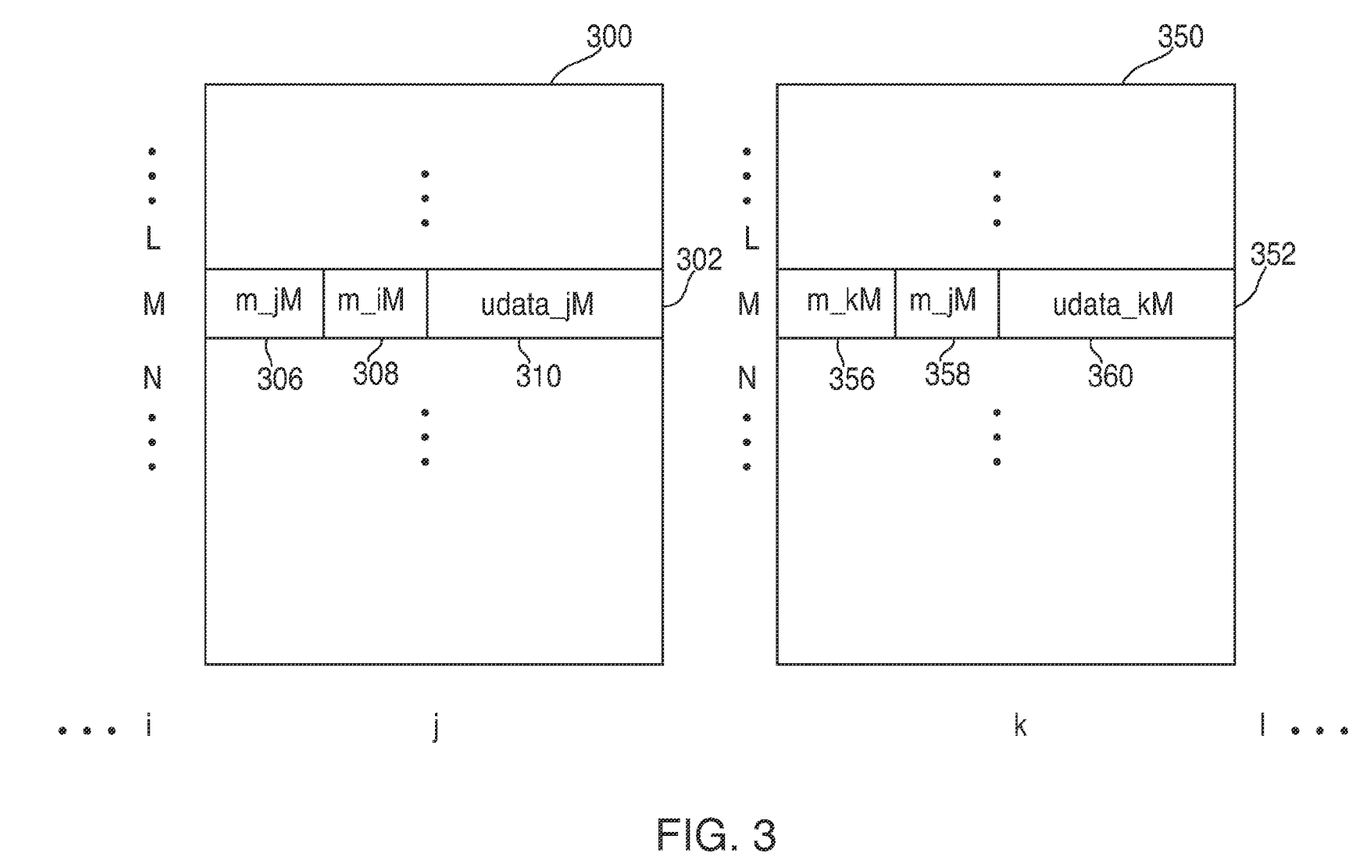
FIG. 3 is a graphical view of two blocks of a non-volatile memory, which illustrates a left-of-me redundancy scheme, in accordance with various embodiments of the invention.
Figure 4:
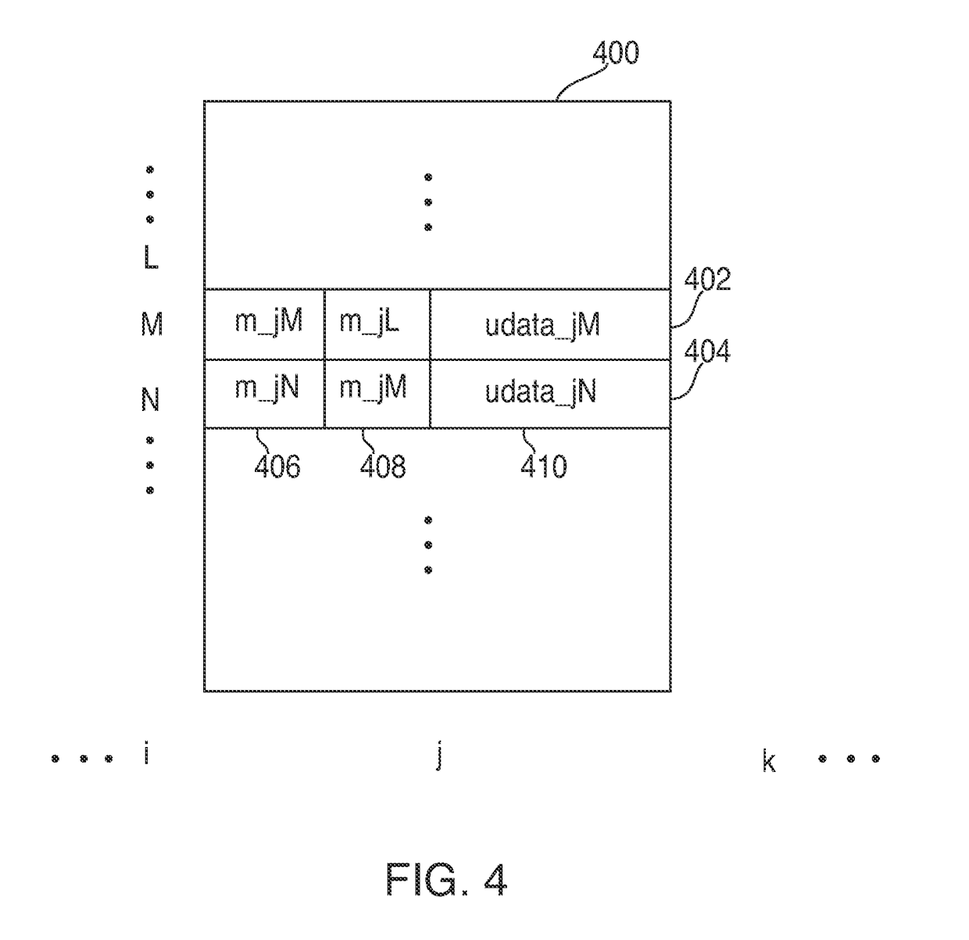
FIG. 4 is a graphical view of a block of a non-volatile memory, which illustrates an above-me redundancy scheme, in accordance with various embodiments of the invention.
Figure 5:
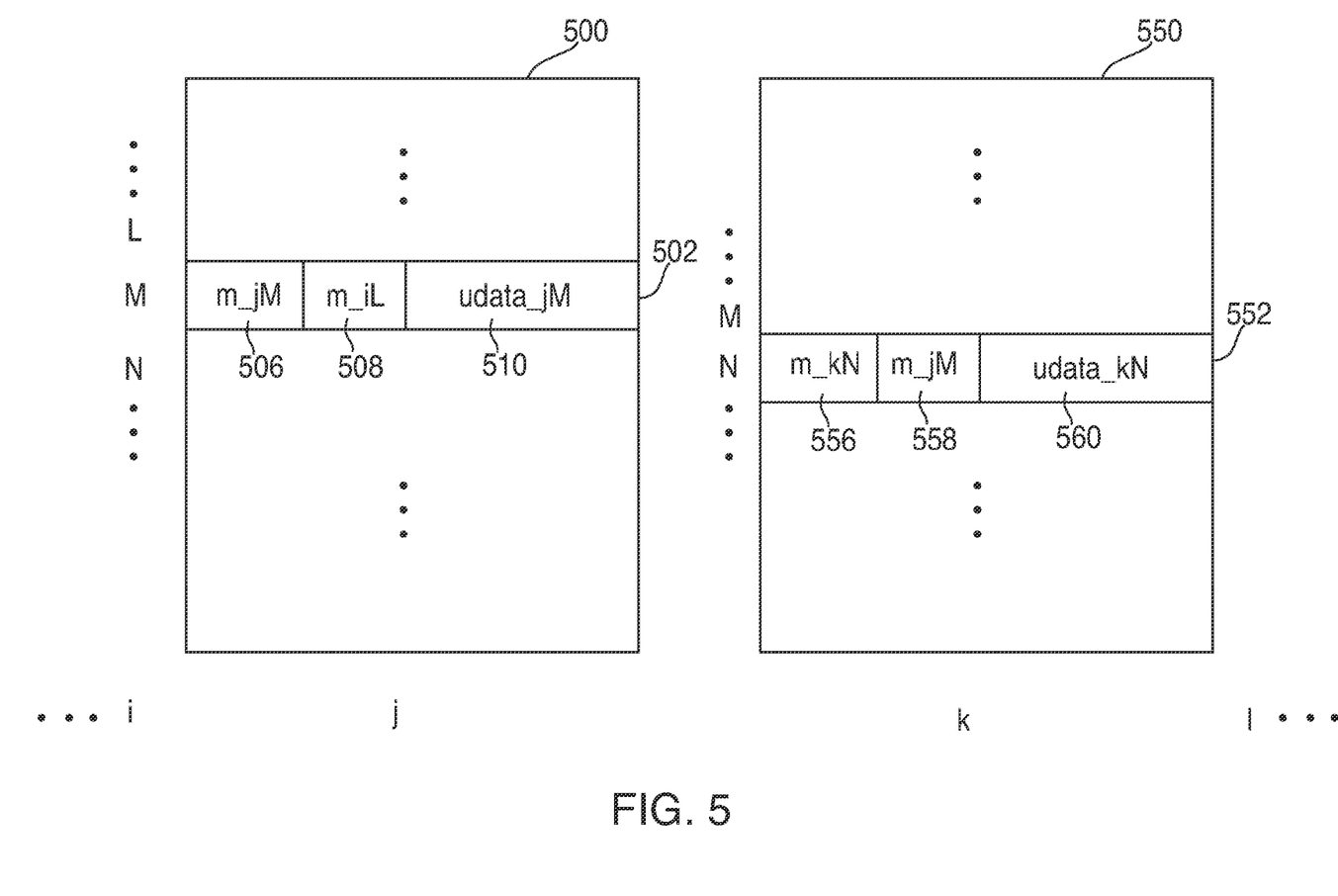
FIG. 5 is a graphical view of two blocks of a non-volatile memory, which illustrates a diagonal-to-me redundancy scheme, in accordance with various embodiments of the invention.

Referring now to FIGS. 3-5, graphical views of various pages and blocks of non-volatile memory 220 (FIG. 2) are shown in accordance with various metadata redundancy schemes. In particular, FIG. 3 illustrates a metadata redundancy scheme referred to as "left-of-me" redundancy, FIG. 4 illustrates a metadata redundancy scheme referred to as "above-me" redundancy, and FIG. 5 illustrates a metadata redundancy scheme referred to as "diagonal-to-me" redundancy. For clarity, in FIGS. 3-5 and elsewhere in this disclosure, the following naming conventions may be used: udata_xy may refer to user data stored at block x, page y, and m_xy may refer to metadata associated with the user data stored at block x, page y.

Turning first to FIG. 3, a graphical view of blocks 300 and 350 are shown, which may illustrate left-of-me metadata redundancy. In some embodiments, blocks 300 and 350 may have any suitable adjacent positions j and k in a sequence of blocks in the same super block, where position k is to the "right" of position j. That is, blocks 300 and 350 may have corresponding positions in neighboring integrated circuits in NVM 220. In other embodiments, blocks 300 and 350 may have any suitable adjacent positions j and k in a sequence of blocks in the same integrated circuit.

Blocks 300 and 350 may each include a number of pages, including pages 302 and 352, respectively. Pages 302 and 352 may be located at the same position M in their respective blocks, where position M can be located at any suitable location along blocks 300 and 350. Thus, page 302 may be directly to the "left" of page 352.

Page 302 of block 300 may include a data portion 310 for storing user data (i.e., udata_jM), a first metadata portion 306 for storing metadata associated with the user data (i.e., m_jM, such as a logical address), and a second metadata portion 308 for storing redundant metadata. Similarly, page 352 of block 350 can include first metadata portion 356, second metadata portion 358, and data portion 360.

In the illustrated left-of-me redundancy scheme, some or all of the pages of NVM 220 may store redundant metadata associated with the user data from a corresponding page in a previous block (i.e., the page to the "left" of the current page). For example, page 352 may use its second metadata portion 358 to store a redundant copy of the metadata from first metadata portion 306 of page 302, and page 302 may use its second metadata portion 308 to store a redundant copy of the metadata from a page to the left of page 302 (i.e., at position i). This way, for example, the metadata for udata_jM of page 302 may be stored in at least two locations (i.e., first metadata portion 306 of page 302 and second metadata portion 358 of page 352), and if page 302 becomes unreadable for any reason, the metadata for udata_jM may still be recovered from page 352.

Referring now to FIG. 4, a graphical view of block 400 is shown, which may illustrate above-me metadata redundancy. Block 400 may be located at any suitable position j in a single integrated circuit or any suitable position j in a super block of non-volatile memory 220 of FIG. 2. Block 400 may include a number of pages, including pages 402 and 404. Pages 402 and 404 may be located at any suitable adjacent positions M and N, respectively, in a sequence of pages, where position M may be "above" position N.

Like the pages discussed in connection with FIG. 3, pages 402 and 404 may each include a first metadata portion 406 for storing metadata (e.g., a logical address), a second metadata portion 408 for storing redundant metadata (e.g., a redundant logical address), and a data portion 410 for storing user data associated with the metadata at portion 406.

In the illustrated above-me redundancy scheme, some or all of the pages of NVM 220 may store redundant metadata associated with the user data from an immediately preceding page (i.e., the page "above" the current page). For example, page 404 may use its second metadata portion 408 to store a redundant copy of the metadata stored in page 402, and page 402 may use its second metadata portion 408 to store a redundant copy of the metadata stored in a page at position L above position M. The metadata for udata_jM of page 402, therefore, may be stored in at least two locations (i.e., first metadata portion 406 of page 402 and second metadata portion 408 of page 404), and if page 402 becomes unreadable for any reason, the metadata for udata_jM may still be recovered from page 404.

Referring now to FIG. 5, a graphical view of blocks 500 and 550 of NVM 220 is shown, which may illustrate diagonal-to-me metadata redundancy. Blocks 500 and 550 may be positioned in relation to each other in any of the ways discussed above in connection with blocks 300 and 350 (FIG. 3), respectively. Blocks 500 and 550 may include any suitable number of pages, including pages 502 and 552, respectively. Page 502 may be located at any suitable position M along block 500. Page 552 may be located at position N, which may be one place lower along block 550 than position M along block 550. Accordingly, page 502 may be "diagonal" from page 552, because page 502 is offset from page 552 by both a page and a block.

Like the pages discussed in connection with FIGS. 3 and 4, page 500 may include a first metadata portion 506 for storing metadata (i.e., m_jM, such as a logical address), a second metadata portion 508 for storing redundant metadata (i.e., m_iL, such as a redundant logical address), and a data portion 510 for storing user data associated with the metadata at portion 506 (i.e., udata_jM). Similarly, page 550 can include first metadata portion 556, second metadata portion 558, and data portion 560.

In the illustrated diagonal-to-me redundancy scheme, some or all of the pages of NVM 220 may store redundant metadata associated with the user data from a preceding page and a preceding block. For example, page 552 can use second metadata portion 558 to store a redundant copy of the metadata from page 502, which is positioned diagonally from page 552, and page 502 can use second metadata portion 508 to store a redundant copy of the metadata from a page diagonal to page 502. The metadata for udata_jM of page 502, therefore, may be stored in at least two locations (i.e., first metadata portion 506 of page 502 and second metadata portion 558 of page 552), and if page 502 becomes unreadable for any reason, the metadata for udata_jM may still be recovered from page 552.

The left-of-me, above-me, and diagonal-to-me redundancy schemes illustrated in FIGS. 3-5 show embodiments where redundant metadata is stored in a page that is one page and/or one block away from the page that it is backing up. It should be understood that this is merely illustrative, and that in any of these schemes, the redundant metadata may be stored in a page that is more than one page and/or block from the page that it is backing up. For example, in a left-of-me redundancy scheme, a backup memory location may store redundant metadata for another memory location that is two, three, four, five, or more blocks to the left of the backup memory location.

Moreover, FIGS. 3-5 illustrate embodiments where a backup memory location may store redundant metadata for one other memory location. In other embodiments, each memory location can include additional metadata portions (e.g., a third, fourth, or fifth metadata portion) to store redundant metadata for more than one other memory location. In these embodiments, one redundancy scheme may be extended. For example, left-of-me redundancy may be extended by having a page store redundant metadata for any number of pages to the left of that page. In other embodiments, two or more of the redundancy schemes may be combined and/or extended. For example, left-of-me redundancy and above-me redundancy can be combined such that a page may store redundant metadata for any number of pages to the left of that page and may store redundant metadata for any number of pages above that page.

Also, the three types of metadata redundancy schemes discussed above in connection with FIGS. 3-5 are merely illustrative. It should be understood that any other suitable redundancy scheme may be used, such as "below-me" redundancy, "right-of-me" redundancy, or "diagonal-to-me" redundancy using a different diagonal direction. These redundancy schemes may involve a current page storing redundant metadata for a page to the right, below, or to the right and below of the current page, respectively.

In some embodiments, the metadata redundancy scheme may be selected based on the order in which data is programmed into the non-volatile memory. That is, in some embodiments, NVM interface 218 of FIG. 2 may be configured to erase a number of super blocks, and then to program the erased blocks with updated information in some suitable order. For example, in some embodiments, NVM interface 218 may program the first pages of a super block from the leftmost block to the rightmost block, then the second pages of the super block from the leftmost block to the rightmost block, and so on.

With this programming order, NVM interface 218 may choose left-of-me, above-me, or diagonal-to-me redundancy schemes instead of below-me, right-of-me, and diagonal-to-me (in another direction) redundancy schemes. This is because, in the former set of redundancy schemes, the redundant copy of metadata may be stored in a memory location that is programmed later than the memory location with the original copy of the metadata. Thus, NVM interface 218 may implement the redundancy scheme by maintaining metadata in a buffer after the original copy is stored, and then retrieving the buffered metadata in response to a later write request for use in storing a redundant copy. This technique is discussed in greater detail in connection with process 600 of FIG. 6.

NVM interface 218 may implement below-me, right-of-me, or another form of diagonal-to-me redundancy when a different order of programming is implemented. Alternatively, NVM interface 218 may implement below-me, right-of-me, or another form of diagonal-to-me redundancy when NVM interface 218 uses an approach for implementing a metadata redundancy scheme that is different than the above-described buffering technique.

Figure 6:
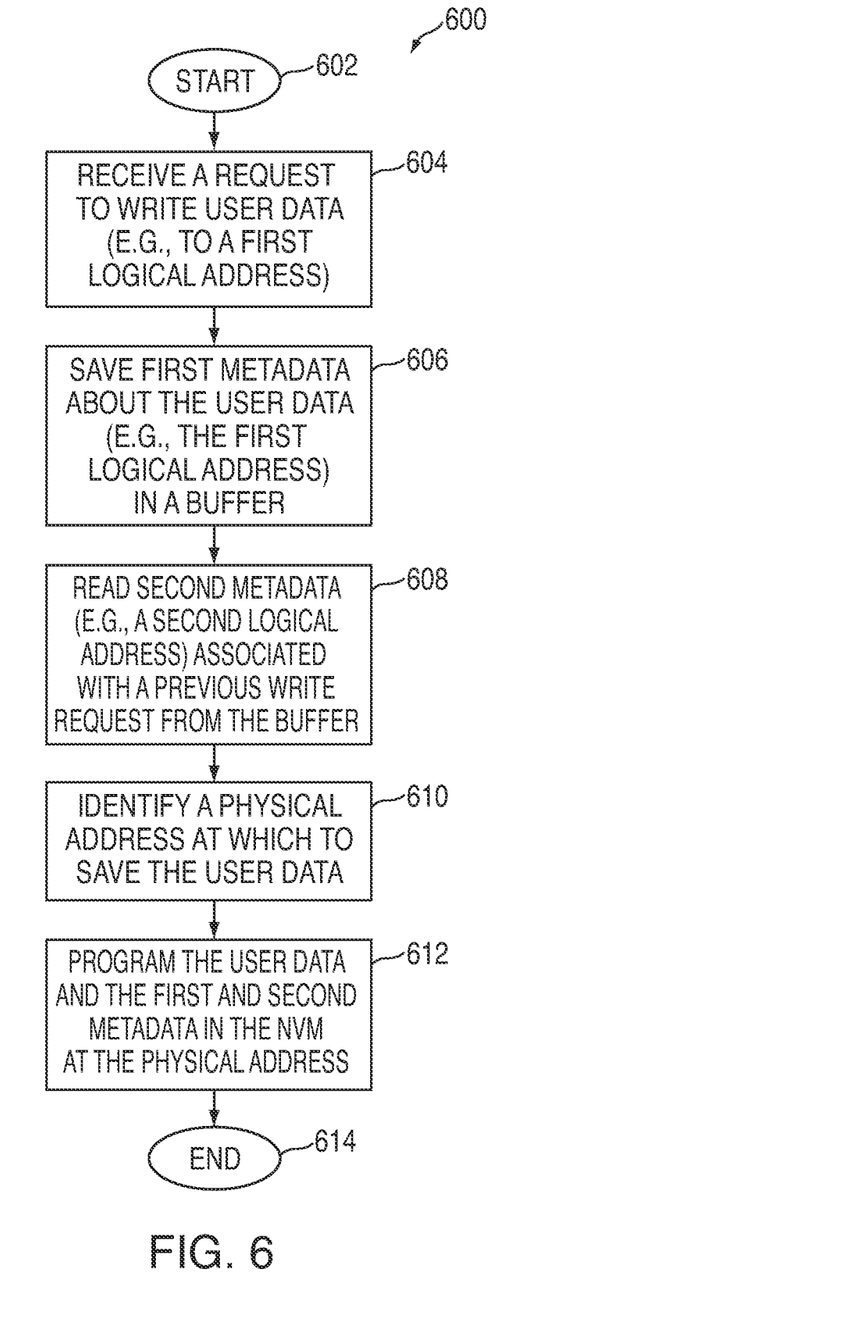
FIG. 6 is a flowchart of an illustrative process for storing user data using a metadata redundancy scheme in accordance with various embodiments of the invention.
Figure 7:
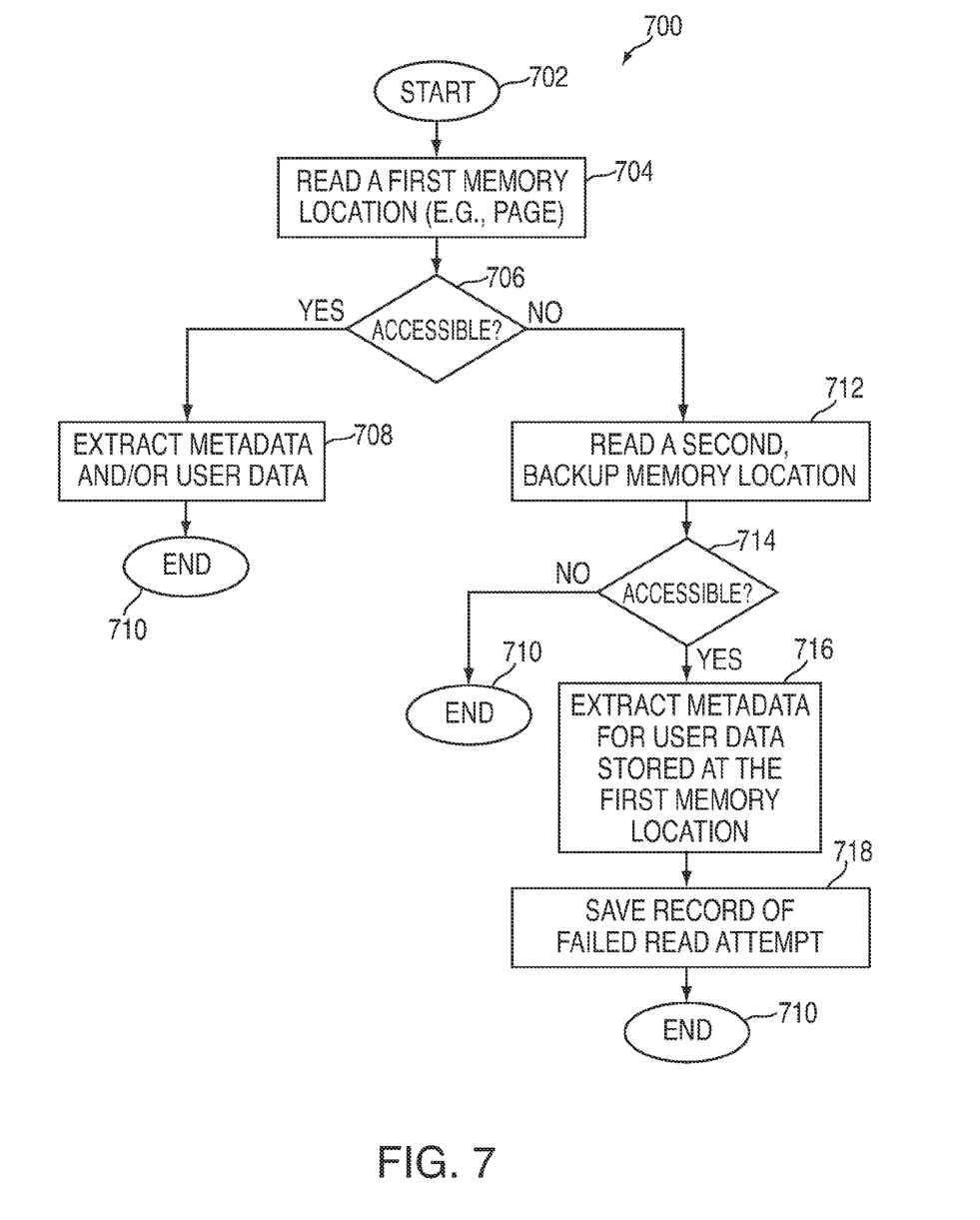
FIG. 7 is a flowchart of an illustrative process for recovering metadata when a metadata redundancy scheme is employed in accordance with various embodiments of the invention.

Referring now to FIGS. 6 and 7, flowcharts of illustrative processes 600 and 700 are shown in accordance with various embodiments of the invention. Processes 600 and 700 may be executed by any suitable memory interface, such as NVM interface 118 or 218 of FIGS. 1 and 2, respectively, to employ a metadata redundancy scheme.

Turning first to FIG. 6, process 600 may illustrate steps used to store redundant metadata in one or more memory locations (e.g., pages) of a non-volatile memory, such as a flash memory. Process 600 may begin at step 602. At step 604, the memory interface may receive a request to write user data to the NVM. The write request can include a first logical address at which to store the user data.

Then, at step 606, the memory interface may save first metadata about the user data in a buffer. The buffer may be created in any suitable location of an electronic device, such as memory 114 of FIG. 1. The first metadata can include data indicative of the first logical address, for example. By saving the first metadata in the buffer, the memory interface can retrieve the first metadata responsive to a subsequent write request or responsive to the memory interface moving to another memory location. This way, the first metadata may be saved with other user data that is associated with the subsequent write request (i.e., as the redundant metadata).

To obtain the redundant metadata for the current write request, the memory interface may read second metadata from the buffer at step 608. The second metadata may be associated with user data from a previous write request, such as user data that has already been stored in the non-volatile memory. The second metadata may include, for example, data indicative of a second logical address corresponding to the previously-stored user data.

Continuing to step 610, the memory interface can determine a physical address at which to save the current user data. At step 612, the memory interface can program the current user data, the first metadata, and the second metadata in the non-volatile memory at the determined physical address. Thus, the memory location corresponding to the determined physical address can include metadata for the user data from the current write request as well as metadata for the user data from a previous write request.

Process 600 may then end at step 614. Alternatively, process 600 may move back to step 604, where the memory interface may receive a second write request. In some embodiments, the second write request may lead the memory interface to read the first metadata, which was stored at step 606 during the previous iteration of process 600, at step 608 in the current iteration of process 600. In these embodiments, the memory interface may store the first metadata as the redundant metadata in step 612 of the current iteration.

Referring now to FIG. 7, a flowchart of illustrative process 700 is shown for recovering metadata when a metadata redundancy scheme is employed. Process 700 may illustrate the steps that a memory interface may execute when performing a read operation on a non-volatile memory.

Process 700 may begin at step 702. At step 704, the memory interface may read a first memory location (e.g., a first page) of the non-volatile memory. At step 706, the memory interface may determine whether the first memory location is accessible. For example, the memory interface may determine whether data read from the first memory location contains too many errors and cannot be interpreted. In these embodiments, the memory interface can apply error detection/correction to the data and may determine whether error correction can produce a valid codeword. As another example, the memory interface may determine whether the read operation itself failed, and that the NVM returned a "no-access" vector signaling this occurrence.

If, at step 706, the memory interface determines that the data at the first memory location is accessible, process 700 may move to step 708. At step 708, the memory interface can extract the metadata and/or the user data from the data read from the first memory location. Process 700 may then end at step 710.

Returning to step 706, if the memory interface determines instead that access to the first memory location (e.g., page) failed, process 700 may move to step 712. The steps along this branch of process 700 may enable the memory interface to recover metadata associated with the user data at the first memory location even if the user data at that location may not be recoverable.

At step 712, the memory interface may read a second, backup memory location. The second memory location may be selected based on its position in the non-volatile memory relative to the first memory location. For example, if left-of-me redundancy is employed, at step 712 the memory interface can read the memory location to the right of the first memory location (i.e., the corresponding page in the next block of the super block).

Then, at step 714, the memory interface may determine whether the second memory location is accessible. For example, as discussed above in connection with step 706, the memory interface may determine whether data read from the memory location contains too many errors, or the memory interface may determine whether the read operation itself failed. If, at step 714, the memory interface determines that the data from the second memory location is inaccessible, process 700 may end at step 710 without recovering the metadata for the user data at the first memory location. In other embodiments, if the employed metadata redundancy scheme stores metadata in more than two locations (i.e., in more than just the first and second memory locations), the memory interface may attempt to recover metadata by reading a second backup memory location (e.g., at a step similar to step 712).

Returning to step 714, if the memory interface determines that data at the second memory location is accessible, process 700 may continue to step 716. At step 716, the memory interface can extract, from the data read from the second memory address, metadata for user data stored at the first memory location. Then, at step 718, the memory interface can store a record of the failed read attempt from step 704. For example, the extracted metadata can include data indicative of a redundant logical address, and the memory interface can store a record that the user data associated with that redundant logical address, which is supposed to be stored at the first memory location, is no longer available. Without the redundant logical address, the memory interface might not be able to determine what kind of user data was stored at the first memory location. Following step 718, process 700 may end at step 710.

It should be understood that processes 600 and 700 of FIGS. 6 and 7, respectively, are merely illustrative. Any of the steps may be removed, modified, or combined, and any additional steps may be added, without departing from the scope of the invention.

The described embodiments of the invention are presented for the purpose of illustration and not of limitation, and the invention is only limited by the claims which follow.

What is claimed is:

1. A method of storing data in a non-volatile memory, the method comprising:
   receiving a first write request to write first user data to a first logical address;
   receiving a second write request to write second user data to a second logical address;
   determining a first physical address at which to store the first user data;
   programming at least a first metadata and the first user data in the non-volatile memory at the first physical address;
   identifying a second physical address at which to store the second user data based on a geometric relationship between the first and second memory locations, such that the geometric relationship defines one of eight potentially adjacent positions in which the second physical memory location is positioned relative to the first physical memory location; and
   programming, at the second physical address:
      the first metadata associated with the first user data,
      a second metadata associated with the second user data, and
      the second user data in the non-volatile memory,
   wherein the first metadata comprises the first logical address and the second metadata comprises the second logical address, and wherein the first metadata is redundantly stored at the first physical address and the second physical address.

2. The method of claim 1 further comprising:
   receiving a third write request to write third user data to a third logical address;
   identifying another physical address at which to store the third user data; and
   programming the second logical address, the third logical address, and the third user data in the non-volatile memory at the other physical address.

3. The method of claim 1, wherein the non-volatile memory comprises flash memory, and wherein the physical address corresponds to a page of the flash memory.

4. The method of claim 1 further comprising:
   saving the first logical address in a buffer responsive to receiving the first write request; and
   reading the first logical address from the buffer for the programming.

5. The method of claim 1 further comprising:
   receiving a third write request to write third user data to a third logical address, wherein the programming further comprises programming the third logical address at the physical address.

6. The method of claim 1 further comprising:
   computing first metadata associated with the first user data; and
   computing second metadata associated with the second user data, wherein the programming further comprises programming the first metadata and the second metadata at the physical address with the first logical address, the second logical address, and the second user data.

7. A memory interface for accessing a non-volatile memory, the memory interface comprising:
   a bus controller for communicating with the non-volatile memory; and
   control circuitry configured to direct the bus controller to:
      store first user data and metadata in a first memory location of the non-volatile memory, wherein the metadata comprises:
         first metadata associated with the first user data, and
         second metadata associated with second user data stored at a second memory location of the non-volatile memory;
      select the second metadata for storage in the first memory location based on a geometric relationship between the first and second memory locations, such that the geometric relationship defines one of eight potentially adjacent positions in which the second physical memory location is positioned relative to the first physical memory location; and store the second user data and the second metadata at the second memory location.

8. The memory interface of claim 7, wherein:
the first metadata comprises at least one of a first logical address, flags, and data associated with the first user data, and
the second metadata comprises a second logical address, flags, and data associated with the second user data.

9. The memory interface of claim 7, wherein the metadata further comprises third metadata associated with third user data stored at a third memory location of the non-volatile memory.

10. The memory interface of claim 7, wherein the non-volatile memory comprises a flash memory, wherein the first memory location comprises a first page of the flash memory, and wherein the second memory location comprises a second page of the flash memory.

11. The memory interface of claim 10, wherein the flash memory comprises a plurality of super blocks, wherein each of the super blocks comprises a sequence of blocks, wherein the first memory location and the second memory location are located in adjacent blocks of one of the super blocks, and wherein the first memory location and the second memory location correspond to pages having a same page number in their respective block.

12. The memory interface of claim 10, wherein the flash memory comprises a plurality of blocks, wherein each of the blocks comprises a sequence of pages, and wherein the first memory location and the second memory location are located in adjacent pages of one block of the plurality of blocks.

13. An electronic device comprising:
a non-volatile memory; and
control circuitry operating under the control of a plurality of modules, the modules comprising:
a file system configured to:
issue a first write command to write first user data to the non-volatile memory; and
issue a second write command to write second user data to the non-volatile memory; and
a memory interface configured to:
store the first user data and first metadata at a first memory location of the non-volatile memory, wherein the first metadata is associated with the first user data;
select a second memory location based on a geometric relationship between the first and second memory locations, such that the geometric relationship defines one of eight potentially adjacent positions in which the second physical memory location is positioned relative to the first physical memory location; and
store the second user data, the first metadata, and second metadata at a second memory location of the non-volatile memory, wherein the second metadata is associated with the second user data, wherein the first metadata is redundantly stored at the first and second memory locations.

14. The electronic device of claim 13, wherein the file system is further configured to request that the first user data be stored at a first logical address, and wherein the first metadata comprises the first logical address.

15. The electronic device of claim 13, wherein the memory interface is further configured to store the first user data with the first metadata at the first memory location.

16. The electronic device of claim 13, wherein the control circuitry is implemented on a system-on-a-chip.

17. A method of recovering a logical address from a non-volatile memory, the method comprising:

determining whether first data stored at a first memory location of the non-volatile memory is accessible, wherein the first data comprises first user data and a first logical address associated with the first user data, wherein the first logical address is redundantly stored in the first memory location and a second memory location of the non-volatile memory, wherein a geometric relationship defines one of eight potentially adjacent positions in which the second physical memory location is positioned relative to the first physical memory location;
in response to determining that the first data is inaccessible, reading second data from the second memory location of the non-volatile memory, the second data comprising the first logical address and second user data; and
extracting the first logical address from the second data.

18. The method of claim 17 further comprising, in response to determining that the first data is accessible, extracting the first logical address from the first data.

19. The method of claim 17, wherein the determining comprises:
reading the first data from the first memory location of the non-volatile memory;
applying error detection or correction to the first data; and
determining that the first data is inaccessible based on the applying.

20. The method of claim 17, wherein the determining comprises:
reading the first data from the first memory location of the non-volatile memory; and
determining whether the non-volatile memory returns a vector signaling a failed read operation responsive to the reading.

21. The method of claim 17 further comprising determining whether the second data stored at the second memory location is accessible, wherein the extracting is performed responsive to the determining that the second data is accessible.

22. The method of claim 21, wherein the second data further comprises a second logical address associated with the second user data.

23. A memory interface for accessing a non-volatile memory, the memory interface comprising:
a bus controller for communicating with the non-volatile memory; and
control circuitry configured to:
direct the bus controller to read from a first memory location to obtain first user data, wherein the first user data comprises first metadata associated with the first user data;
determine that the first user data is not accessible from the first memory location; and
direct the bus controller to read second data from a second memory location based on a geometric relationship defining one of eight potentially adjacent positions in which the second physical memory location is positioned relative to the first physical memory location, wherein the second data comprises the first metadata and second user data, wherein the first metadata is redundantly stored in the first memory location and the second memory location of the non-volatile memory.

24. The memory interface of claim 23, wherein the second data further comprises second metadata associated with the second user data.

25. The memory interface of claim 23, wherein the first metadata comprises at least one of a logical address, flags, and data associated with the first user data.

* * * * *